United States Patent [19]

Härtel

[11] Patent Number: 4,744,547

[45] Date of Patent: May 17, 1988

[54] ELASTIC ENGINE MOUNT

[75] Inventor: Volker Härtel, Germering, Fed. Rep. of Germany

[73] Assignee: Metzeler Kautschuk GmbH, Munich, Fed. Rep. of Germany

[21] Appl. No.: 801,740

[22] Filed: Nov. 26, 1985

[30] Foreign Application Priority Data

Nov. 26, 1984 [DE] Fed. Rep. of Germany ....... 3443029

[51] Int. Cl.$^4$ .......................... F16F 15/04; B60K 5/12
[52] U.S. Cl. ..................................... 267/141; 248/636; 267/52; 267/30; 267/136; 188/379
[58] Field of Search .............. 267/141, 140.4, 141.1, 267/30, 52, 54 R, 54 A, 152, 136, 36 R, 52, 140.3; 188/379, 380; 248/562, 567, 636, 638; 180/291, 300, 312; 416/135, 139, 140

[56]  References Cited

U.S. PATENT DOCUMENTS

| 2,188,689 | 1/1940 | Marco | 267/52 |
| 3,166,337 | 1/1965 | Panzer | 188/380 |
| 4,365,770 | 12/1982 | Mard et al. | 267/136 X |

FOREIGN PATENT DOCUMENTS

| 157810 | 1/1940 | Fed. Rep. of Germany ... 267/140.3 |
| 0026014 | 2/1982 | Japan | 180/312 |
| 1295171 | 11/1972 | United Kingdom | 267/136 |

Primary Examiner—George E. A. Halvosa
Assistant Examiner—Matthew C. Graham
Attorney, Agent, or Firm—Herbert L. Lerner; Laurence A. Greenberg

[57] ABSTRACT

An elastic engine mount with a dynamic stiffness decreasing in dependence on frequency for damping sound transmitted through solids includes a leaf spring having a central region and ends, an elastomer support disposed on the central region of the leaf spring for transmitting force to the leaf spring in a given direction and loading the leaf spring by bending, and at least two support points supporting the leaf spring, the ends of the leaf spring extending freely beyond the support points forming auxiliary masses coupled to the elastomer support vibrating in a direction opposite to the given force transmission direction.

8 Claims, 3 Drawing Sheets

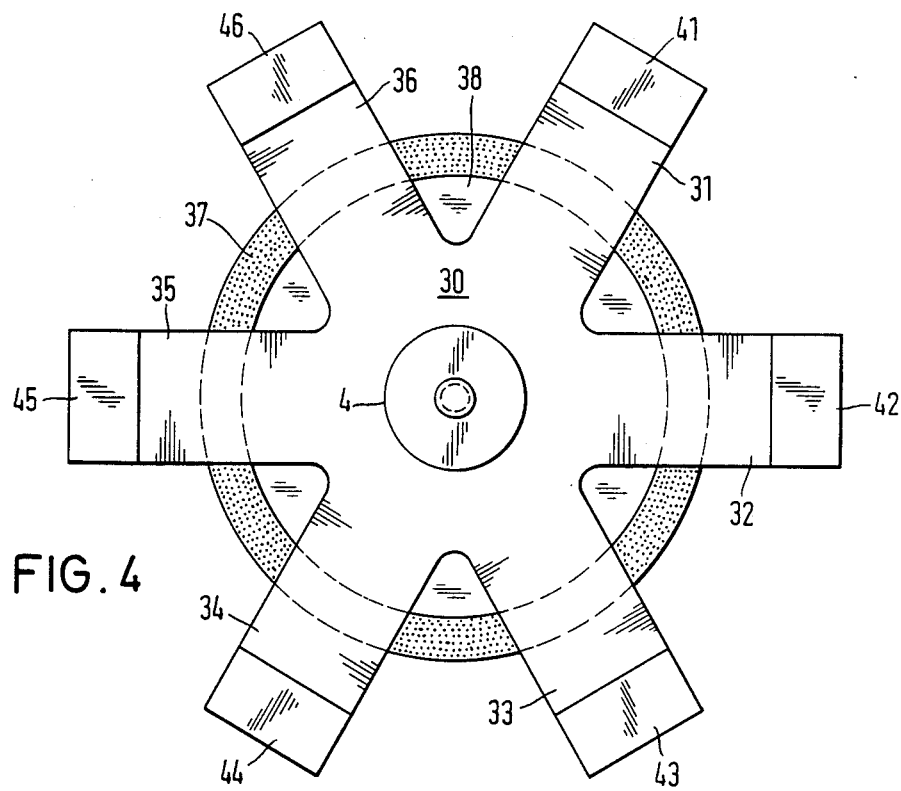
FIG. 4
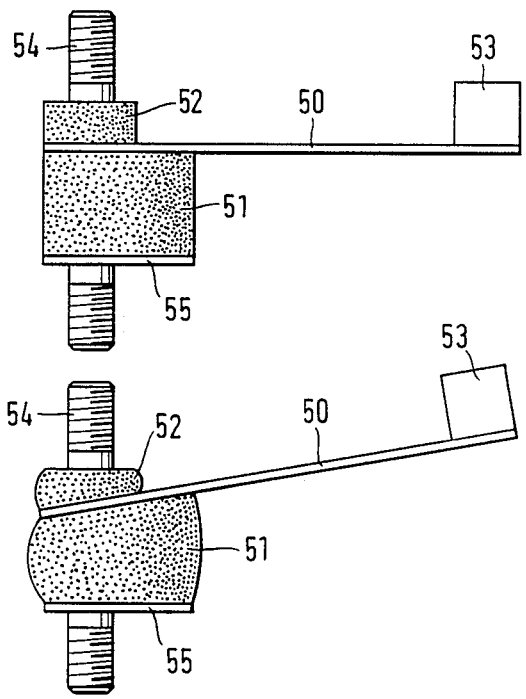
FIG. 5A
FIG. 5B

ELASTIC ENGINE MOUNT

The invention relates to an elastic engine mount or motor support having a dynamic stiffness decreasing in dependence on frequency, for damping sound or vibration transmitted through solids, including an elastomer support for transmitting force and at least one counter-vibrating mass coupled to the elastomer support.

In conventional elastomer supports it is possible to effectively damp the transmission of sound or vibration through solids up to frequencies of several hundred Hz. However, the disadvantage of such strictly elastomer supports lies in the fact that these supports exhibit an increasing dynamic stiffness with increasing frequency, so that the transmission of sound or vibration through the solid materials is increased. Therefore, it has been attempted several times to produce supports with decreasing or only slightly increasing stiffness. Such supports, which are described in German Published, Non-Prosecuted Applications DE-OS Nos. 30 26 878 and 32 44 295, for example, are constructed as hydraulic supports, in which the counter vibrating mass is coupled by means of hydraulic fluid. This mass, which in some structures is the hydraulic fluid itself, first causes a decrease and later an increase of the dynamic stiffness with increasing excitement frequency, according to the vibration-quenching-principle. In several structures, the fluid is also used to damp vibrations with large amplitudes, so that a hydraulically damped engine mount with a counter-acting vibrating mass is produced. With hydraulic supports of this type, the desired damping and the frequency range in which the stiffness decreases, can be adjusted within wide limits. However, such engine mounts are uneconomical technically as well as with regard to difficulty of manufacture.

It is accordingly an object of the invention to provide an elastic engine mount which overcomes the hereinafore-mentioned disadvantages of the heretofore-known devices of this general type and with which decreasing dynamic stiffness can be achieved and adjusted within a wide frequency region, while nevertheless being very simple to manufacture and in particular not requiring a costly hydraulic system.

With the foregoing and other objects in view there is provided, in accordance with the invention, an elastic engine mount or motor support with a dynamic stiffness decreasing in dependence on frequency for damping sound or vibrations transmitted through solids, comprising a flat, plate or leaf spring having a central region and ends, an elastomer support disposed on the central region of the leaf spring for transmitting force to the leaf spring in a given direction and loading the leaf spring by bending, and at least two support points supporting the leaf spring, the ends of the leaf spring extending freely beyond the support points forming auxiliary masses coupled to the elastomer support vibrating in a direction opposite to the given force transmission direction.

In accordance with another feature of the invention, there is provided a counter support in the form of a common base plate, the support points being elastically deformable elastomer bodies fastened to the base plate.

In accordance with a further feature of the invention, there are provided additional masses disposed at the ends of the leaf spring.

Since the spring bends when loaded through the central force and since it develops a parabolic shape due to the corresponding deformation of the elastomer bodies which serve as the support points, the ends of the leaf spring move in a direction opposite to the direction of the leading force, so that upon the occurrence of dynamic loading a counter-vibrating effect is achieved. Thus, the masses of the edges of the leaf spring, which may be increased by attaching additional masses, are accelerated against the respective loading direction and therefore lower the forces acting on the support points, resulting in frequencydependent lowering of the dynamic stiffness.

In accordance with an added feature of the invention, the leaf spring is formed of a fiber compound material.

In accordance with an additional feature of the invention, there is provided a conventional rubber and metal wedge-shaped support or engine mount having a support center forming the support points.

In accordance with again another feature of the invention, there is provided another leaf spring having a central region and another elastomer support disposed at the central region of the other leaf spring acting as a counter support, the support points being elastomer bodies disposed between the leaf springs, and the other leaf spring and elastomer support being disposed as symmetrical mirror images of the first-mentioned leaf spring and elastomer support on an opposite side of the elastomer bodies.

In order to achieve the same effect, in accordance with again a further feature of the invention, the leaf spring is star-shaped and has a plurality of arms extending radially outwardly from the central region thereof, and the support points are locations along an annular elastomer body.

In accordance with again an added feature of the invention, the support points are elastomer bodies, and the elastomer support and elastomer bodies have contact surfaces entirely connected to the leaf spring.

With the objects of the invention in view there is also provided an elastic engine mount or motor support with a dynamic stiffness decreasing in dependence on frequency for damping sound or vibrations transmitted through solids, comprising a leaf spring having first and seconds ends, a first elastomer support disposed on the first end of the leaf spring for transmitting force to the leaf spring in a given direction, and a second elastomer support having a larger cross section than the first elastomer support being disposed eccentrically below the first elastomer support and below the leaf spring clamping the leaf spring therebetween and eccentrically transmitting force to the center of the second elastomer support, the second end of the leaf spring being a free end forming an auxiliary mass coupled to the first elastomer support vibrating in a direction opposite to the given force transmission direction. Other features which are considered as characteristic for the invention are set forth in the appended claims.

Although the invention is illustrated and described herein as embodied in an elastic engine mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 is a top-plan view of an engine mount with a star-shaped leaf spring;

FIG. 5 A is a side-elevantional view of an engine mount with an single leaf spring at one side thereof; and FIG. 5 B is a similar view of the same engine mount in the loaded state.

Figure 1A:
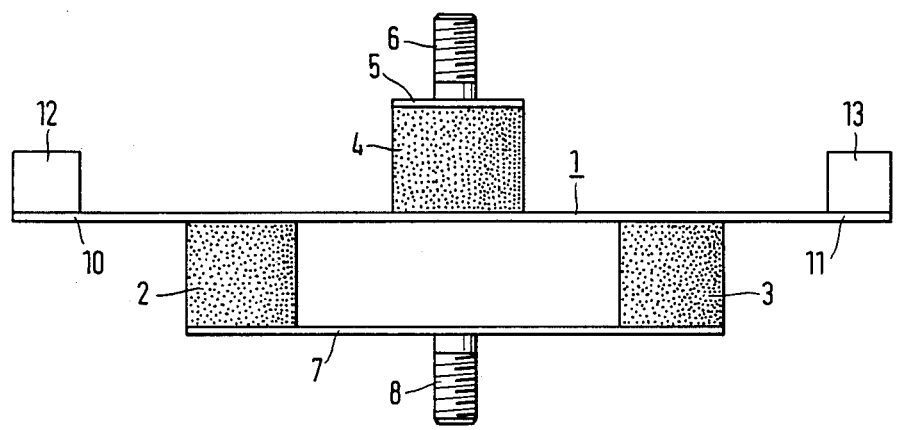
FIG. 1A is a digrammatic, side-elevational view of an elastic motor support or engingount with a leaf or plate spring, which may also be referred to as a flat spring.
Figure 1B:
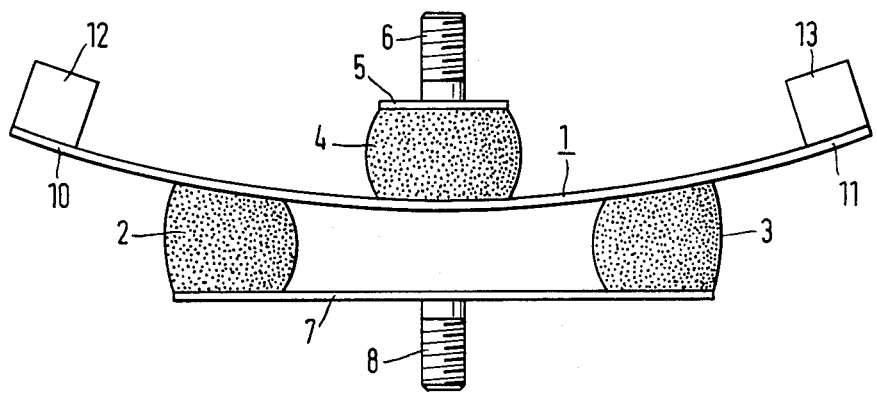
FIG. 1B is a view similar to FIG. 1A, showing the same engine mount in the loaded state.

Referring now to the figures of the drawings in detail and first, particularly to FIG. 1 thereof, it is seen that the engine mount is essentially formed of a leaf or plate spring 1 which rests on two points in the form of elastically deformable elastomer bodies 2 and 3, and a central force-transmitting additional elastomer support 4. The elastomer support 4 is fixedly connected to a metal plate 5, which carries a threaded stud 6 that may serve for connection to the motor or engine which is to be supported. The two elastomer bodies 2 and 3 which serve as the support points, are connected with each other by means of a base plate 7, which acts as a counter support for the central support 4 and can also be provided with a threaded stud 8 for mounting, for example.

The leaf spring can be made of conventional metallic spring materials. However, it is even more advantageous to use fiber compound materials with glass or carbon fibers, in which case the leaf spring is connected with the elastomer supports 2, 3 and 4 over large areas in order to avoid high stress points, which would reduce the life expectancy of the device.

The flat spring 1 has ends 10 and 11 which extend beyond the two elastomer supports 2 and 3 by given moment arms with given resonant frequencies. When loaded, i.e. when a force is applied through the elastomer support 4, the leaf spring 1 bends downward, so that the two ends 10 and 11 of the spring move in a direction opposite the direction in which the load is applied with unlimited movement at all frequencies below the given resonance frequency of the moment arms, as can be seen clearly in FIG. 1B. The two elastomer supports 2 and 3 simultaneously deform by compression, corresponding to their spring characteristics, but permit a parabolalike bending of the leaf spring 1, because they deform more strongly at their inner sides and less strongly at their outer sides. The spring rates should be chosen in such a way that the elastomer bodies are not overstressed by tension at their outer sides when they are loaded. During dynamic loading, the ends 10 and 11 of the leaf spring which extend beyond the elastomer bodies 2 and 3, have a counteracting effect. Their mass is accelerated against the direction of application of the load and thereby reduces the forces acting on the elastomer supports 2 and 3, causing a frequency-dependent reduction of the dynamic stiffness.

This effect can be enhanced by placing additional masses 12 and 13 at the ends 10 and 11 of the leaf spring 1. The parameters of the bending stiffness, mass and length of the spring ends 10 and 11, permit the frequency range to be exactly adjusted, so that the dynamic stiffness of the motor support lies below its static stiffness.

Besides this adjustment of the stiffness behavior, the total damping of the system can be set by a suitable choice of elastomer types with high damping properties, while leaf springs formed of steel or fiber compound materials only have very little selfdamping properties.

Figure 2:
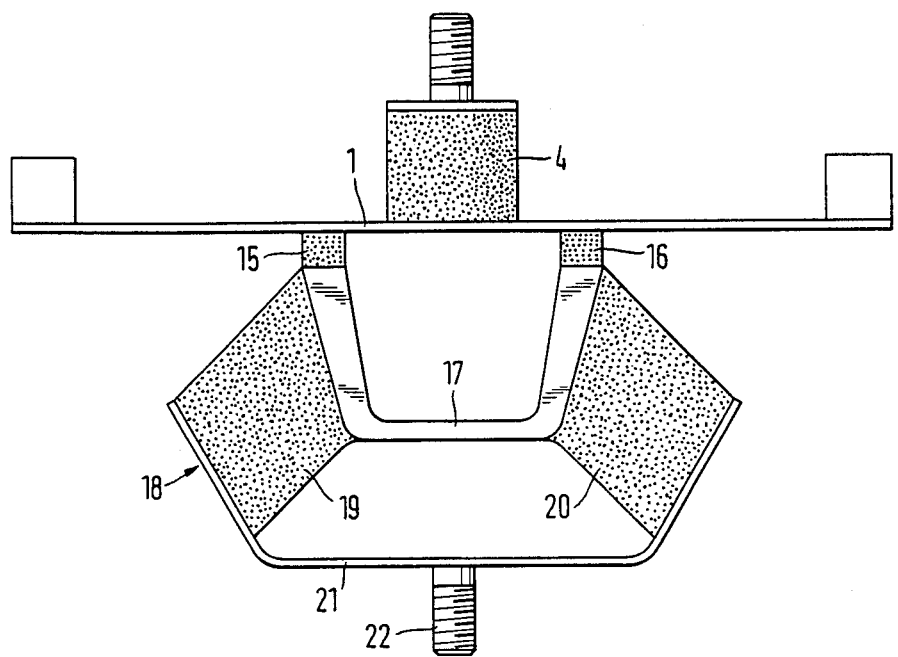
FIG. 2 is a side-elevational view of an engine mount of the same type in combination with a conventional wedge-shaped support.

A motor support of this type can be easily combined or coupled with other elastic supports, as shown in FIG. 2 where a combination with a conventional wedge-shaped support or mount is shown. In the FIG. 2 device, a U-shaped support center or core 17 with two elastomer bodies 15 and 16 of a wedge-shaped support mount 18, serve as contact points for the leaf spring 1 and a support is provided by a bracket 21 and a fastening point 22 through two wedge-shaped rubber elements 19 and 20, which are attached to the center or core 17.

Figure 3:
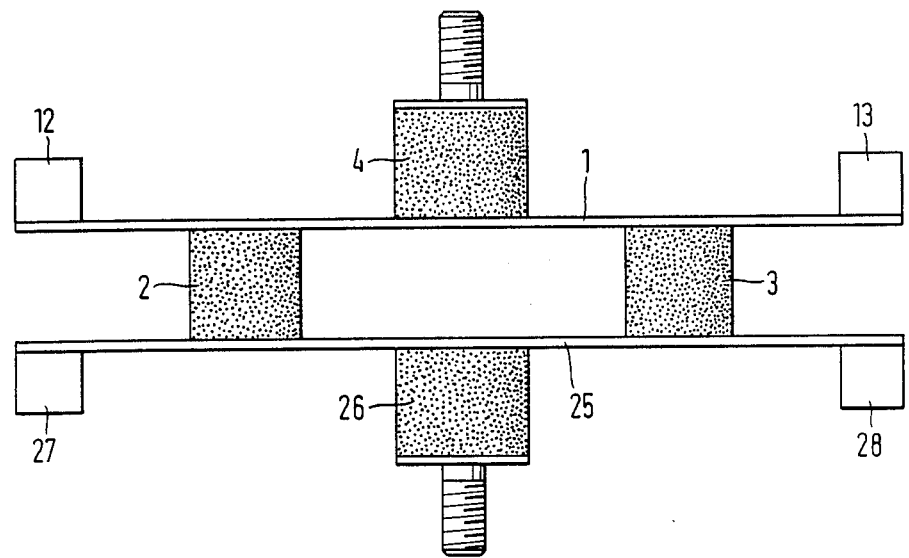
FIG. 3 is a side-elevational view of an engine mount with two leaf springs disposed in such a way as to be mirror images of each other.

In order to increase the effect of the counter-acting masses, it is possible to construct an elastic motor support as shown in FIG. 3. In the FIG. 3 device, two leaf springs 1 and 25 are disposed as mirror images of each other with respect to the two elastomer bodies 2 and 3, which serve as the support points. The structure also includes a central elastomer support 4 serving as a force application point and an additional elastomer support 26 in the center of the lower leaf spring 25 serving as a counter support and fastening point. Additionally, in this case the ends of the leaf spring are connected with additional masses 12, 13 and 27, 28, respectively. This is done so that upon the occurrence of dynamic loading through the elastomer support 4 and upon the mutual approach of the two elastomer supports 4 and 26 with the corresponding bending of the leaf springs 1 and 25, the masses 12, 13 and 27, 28, respectively, move in counter phase to the direction of the introduced force and thereby produce an additional lowering of the dynamic stiffness.

FIG. 4 illustrates another embodiment with a starshaped leaf spring 30. In this case six radial spring arms 31 to 36 extend outward from the central region of the elastomer support 4 and carry additional masses 41 to 46 at the ends thereof. This starshaped leaf spring 30 rests on an annular elastomer support 37, which is carried by a circular disc-shaped base plate 38. When loaded in the direction perpendicular to the plane of the drawing, the spring arms 31 to 36 with their masses 41 to 46 move upward, i.e. similar to an inverted umbrella. This embodiment also makes it possible to enhance the effect of the counter-vibrating masses.

Another basic construction for achieving the objective with the principle of the invention is shown in the embodiment according to FIGS. 5A and 5B. In FIGS. 5A and 5B a leaf spring 50 is only connected to the elastomer supports at one side thereof, in the following manner. According to FIG. 5A, the leaf spring 50 is connected with an elastomer body 51 which serves as a support, over the entire area of the left end thereof. A force-introducing elastomer support 52 is provided at the upper surface of the left end of the leaf spring 50. The elastomer support 52 has a smaller cross section than the bottom support 51 and it is disposed eccentrically relative to the support 51 and it is displaced toward the outer end of the leaf spring 50. An additional mass 53 is also disposed at the free end of the leaf spring 50. If a force is introduced through the stud 54 and the elastomer support 52 which acts eccentrically with respect to the elastomer support 51, the surfaces of the elastomer support 51 which are formed by the leaf spring 50 and a counter support plate 55 and which were originally parallel, are displaced and accelerate the mass 53, which is disposed at the end of the spring 50. This acceleration is also directed in the direction opposite to the direction of the loading force. In this way it is also possible to obtain a decreasing dynamic stiffness with this construction of the engine mount.

The essential advantage of all of the illustrated embodiments is their simple construction and their capability of widely adjusting the frequency range, which results from the combination of the material parameters of the rubber and the fiber reinforced materials. Due to the introduction of the forces over the large area of the elastomer blocks, concentrated stress points are avoided and the dynamic life expectancy of these structural parts is greatly improved. The elastomer blocks of these structures simultaneously function as springs, supports and joints without play.

Through suitable matching of the materials and the construction, it is possibel to avoid an increase of the stiffness beyond the minimum stiffness caused by the mass forces which are now predominant or to shift it to a frequency range where it is not detrimental. For this reason, the spring tongues which extend beyond their supports are constructed with respect to their stiffness and mass distribution in such a way that their first bending self resonance lies in the tongue region, i.e. at these frequencies the tongue is excited into self-resonane and acts as a damper in the resonance state, which compensates for the steep stiffness increase. The increase of the stiffness then takes place in a frequency region which is not relevent for the respective vibration problem, i.e. in the case of 4 cylinder Otto or spark ignition engines it takes place in frequency regions above 200 Hz.

I claim:

1. Elastic engine mount with a dynamic stiffness decreasing in dependence on frequency for damping sound transmitted through solids, comprising a leaf spring having a central region and ends, an elastomer support disposed on said central region of said leaf spring for transmitting force to said leaf spring in a given direction and loading said leaf spring by bending, and at least two support points supporting said leaf spring, said ends of said leaf spring extending freely beyond said support points forming auxiliary masses coupled to said elastomer support, said auxiliary masses each being extended beyond a respective one of said support points by a given moment arm with a given resonance frequency, said auxiliary masses vibrating with unlimited movement in a direction opposite to said given force transmission direction at all frequencies below said given resonance frequency of said moment arms.

2. Elastic engine mount according to claim 1, including a counter support in the form of a base plate, said support points being elastically deformable elastomer bodies fastened to said base plate.

3. Elastic engine mount according to claim 1, including additional masses disposed at said ends of said leaf spring.

4. Elastic engine mount according to claim 1, wherein said leaf spring is formed of a fiber compound material.

5. Elastic engine mount according to claim 1, including a rubber and metal wedge-shaped support having a support center forming said support points.

6. Elastic engine mount according to claim 1, including another leaf spring having a central region and another elastomer support disposed at said central region of said other leaf spring acting as a counter support, said support points being elastomer bodies disposed between said leaf springs, and said other leaf spring and elastomer support being disposed as mirror images of said firstmentioned leaf spring and elastomer support on an opposite side of said elastomer bodies.

7. Elastic engine mount according to claim 1, wherein said leaf spring is star-shaped and has a plurality of arms extending radially outwardly from said central region thereof, and said support points are locations along an annular elastomer body.

8. Elastic engine mount according to claim 1, wherein said support points are elastomer bodies, and said elastomer support and elastomer bodies have contact surfaces entirely connected to said leaf spring.

* * * * *